(12) United States Patent
Park

(10) Patent No.: US 7,077,900 B2
(45) Date of Patent: Jul. 18, 2006

(54) METHOD FOR FABRICATING OPTICAL FIBER PREFORM USING EXTRUSION DIE

(75) Inventor: Joon Yong Park, Seoul (KR)

(73) Assignee: Samsung Electronics Co. Ltd., Gyeonggi-do (KR)

( * ) Notice: Subject to any disclaimer, the term of this patent is extended or adjusted under 35 U.S.C. 154(b) by 35 days.

(21) Appl. No.: 10/344,609

(22) PCT Filed: Jun. 12, 2002

(86) PCT No.: PCT/KR02/01109

§ 371 (c)(1),
(2), (4) Date: Mar. 31, 2003

(87) PCT Pub. No.: WO02/101422

PCT Pub. Date: Dec. 19, 2002

(65) Prior Publication Data

US 2004/0031435 A1   Feb. 19, 2004

(30) Foreign Application Priority Data

Jun. 13, 2001   (KR) ................................. 2001-33141

(51) Int. Cl.
*C30B 33/06* (2006.01)
(52) U.S. Cl. .................... 117/2; 117/1; 117/3; 117/944; 383/123; 383/124; 383/126
(58) Field of Classification Search .................. 117/2, 117/3, 1, 944; 385/123, 124, 126
See application file for complete search history.

(56) References Cited

U.S. PATENT DOCUMENTS 6,496,632 B1 * 12/2002 Borrelli et al. ............. 385/123

OTHER PUBLICATIONS

Birks, T.A. et al., IEEE Photonics Technology Letters, vol. 11, No. 6, pp. 674-676, (1999).
Barkou S.E. et al., Technical Digest, vol. 4, pp. 117-119, (1999).
"Dispersion Compensation Using Single-Material Fibers" By T.A. Birks, D. Mogilevtsev, J.C. Knight, and P.St. J. Russell, IEEE Photonics Technology Letters, vol. 11, No. 6., pp. 674-676, Jun. 1999.
"Dispersion Properties of Photonic Bandgap Guiding Fibers" By Stig E. Barkou, Jes Broeng, and Anders Bjarklev, Department of Electromagnetic Systems, Technical University of Denmark, Building 348, DK-2800 Lyngby, Denmark, pp. 117-119.
J.C. Knight et al., "All-silica single-mode optical fiber with photonic crystal cladding", Optics Letters, vol. 21, No. 19, Oct. 1, 1996, pp. 1547-1549.
T.A. Birks et al., "Endlessly single-mode photonic crystal fiber", Optics Letters, vol. 22, No. 13, Jul. 1, 1997, pp. 961-963.
J.C. Knight et al., "Photonic Band Gap Guidance in Optical Fibers", Science, vol. 282, Nov. 20, 1998, pp. 1476-1478.
T.A. Birks et al., "Full 2-D photonic bandgaps in silica/air structures", Electronics Letters, vol. 31, No. 22, Oct. 26, 1995, pp. 1941-1943.
Jes Broeng et al., "Photonic Crystal Fibers: A New Class of Optical Waveguides", Optical Fiber Technology 5, 1999, pp. 305-330, Academic Press.

* cited by examiner

*Primary Examiner*—Robert Kunemund
(74) *Attorney, Agent, or Firm*—Harness, Dickey & Pierce, P.L.C.

(57) ABSTRACT

Disclosed is a method of fabricating a photonic crystal fiber preform using an extrusion die, comprising the step of extruding a first optical material into a plurality of dispersed phases to axially orient the dispersed phases.

3 Claims, 4 Drawing Sheets

METHOD FOR FABRICATING OPTICAL FIBER PREFORM USING EXTRUSION DIE

This application is the national phase under 35 U.S.C. § 371 of PCT International Application No. PCT/KR02/01109 which has an International filing date of Jun. 12, 2002, which designated the United States of America.

TECHNICAL FIELD

The present invention relates, in general, to a method of fabricating a plastic optical fiber preform using an extrusion die and, in particular, to a method of fabricating a photonic crystal fiber preform using an extrusion die, which has a refractive index difference between a clad region and a core or a photonic crystal band gap by introducing a photonic crystal structure into the clad region.

BACKGROUND ART

As well known to those skilled in the art, photonic crystal fibers are classified into high refractive index core-typed photonic crystal fibers in which a clad having hollows covers a high refractive index core, and light guidance is accomplished according to a total internal reflection mechanism, and low refractive index core-typed photonic crystal fibers in which a clad covers a low refractive index hollow core and light guidance is accomplished according to a photonic crystal band gap mechanism.

Light guidance properties of a photonic crystal fiber having a clad layer in which a photonic crystal structure is formed are disclosed in many articles. For example, Knight et al., "All Silica Single Mode Optical fiber with Photonic Crystal Cladding", Optics Letters, V. 21, No. 19, p 1547 (1996), and Birks, et al., "Endless Single Mode Photonic Crystal Fiber", Optics Letters, V.22, No. 13, p. 961 (1997) disclose characteristics of a single mode photonic crystal fiber comprising a silica core and a porous silica clad layer. In these technologies, a silica tube positioned at a center of a bundle of triangular lattices consisting of a plurality of silica tubes is substituted with a silica rod and the resulting structure is drawn at a high temperature to fabricate the photonic crystal fiber. The silica rod corresponds to the core of a conventional step-index photonic crystal fiber. The clad layer which covers the silica rod has hollows periodically arranged in a transverse section of the photonic crystal fiber. Hollows in the clad layer are axially extended to both ends of the photonic crystal fiber, and so an effective refractive index is changed in the clad layer, thereby causing light guidance properties such as a diameter of mode field or dispersion property to be changed. A mode power distribution in the transverse section of the photonic crystal fiber is one of the most important factors in determining physical properties of the photonic crystal fiber, and a change in the effective refractive index of the clad layer changes the light guidance properties of the photonic crystal fiber. Furthermore, a high power laser beam can be guided in a single mode, differently from the step-index photonic crystal fiber, and advantageously, a relative refractive index of the clad layer against the core can be controlled by changing a hollow fraction in the clad layer. In these photonic crystal fibers, light guidance is accomplished according to a total internal reflection mechanism, i.e. a conventional light guidance mechanism, and the photonic crystal fiber comprises a core region with a high refractive index and a clad layer with a low refractive index. Physical properties of a conventional photonic crystal fiber are described in Broeng et al., "Invited Paper: A new class of optical waveguides", Optical fiber Technology, V.5, p. 305 (1999).

Meanwhile, it is known in the art that when a core, covered with a clad layer, consists of hollows arranged in a predetermined periodical lattice such as a triangle or a honeycomb, a photonic crystal band gap is two-dimensionally formed against a light with a frequency corresponding to the above structure, and so the light is limited within the core region, thereby light guidance is accomplished (Birks et al., "Full 2-D photonic bandgap in silica/air structures", Electronics Letters, V.31, No. 22, p. 1941 (1995), Knight et al., "Photonic band gap guidance in optical fiber", Science, V.282, p. 1476 (1998)).

The photonic crystal band gap structure is considered as a novel notion, and in the case of a photonic crystal band gap material with a three-dimensional periodicity, light with a wavelength corresponding to the structure limitedly flows through the photonic crystal band gap material. In the case of a photonic crystal band gap material with a two-dimensional periodicity, a propagation constant $\beta$ vertical against a periodic plane in which propagation is forbidden is within a predetermined range of values. The photonic crystal band gap material with a two-dimensional periodicity may be utilized to realize light guidance by limiting a light only within a hollow core region covered with the clad layer consisting of the photonic crystal band gap material. As described above, a photonic crystal fiber having a clad layer in which dispersed phases are desirably arranged causes light to be guided only within the core. Accordingly, this photonic crystal fiber may greatly contribute to a high-speed transmission of a large amount of data through an information communications net:

Physical properties of the photonic crystal fiber depend on a refractive index ratio of a continuous phase consisting of an optical material and a dispersed phase mostly consisting of air, a size of the dispersed phase, and a distance between centers of dispersed phases. Additionally, an existence of the photonic crystal band gap depends on these factors.

In a conventional photonic crystal fiber, silica with the refractive index ratio of 1.45 is used as the optical material constituting the continuous phase. The conventional photonic crystal fiber was prepared by tying silica tubes and a silica rod into a bundle in such a way that silica tubes and the rod are arranged in a predetermined manner and drawing them at a temperature of 2000° C. Production of the conventional photonic crystal fiber mostly depends on factors such as a size of each hollow, a distance between centers of dispersed phases, and an arrangement shape of hollows. Such factors cause an effective refractive index of the clad layer to change, and light guidance is realized due to a difference of the refractive index between the clad layer and a silica core, as disclosed in U.S. Pat. No. 5,802,236 and International Pat. Pub. Nos. WO 00-16141, WO 00-37974, WO 99-00685, WO 00-49435, WO 00-49435, WO 00-60358, WO 99-64903, and WO 00-64904.

However, a method of fabricating a photonic crystal fiber preform with a fine-structured section by extruding a polymer optical material with a refractive index of 1.45 is not well known in the art. An extrusion of these porous fibers is applied to fabricate an endoscope comprising multiple core hollows (U.S. Pat. No. 5,471,553) and to fabricate a photonic crystal fiber for optically transmitting a signal (U.S. Pat. No. 6,188,824), but these patents also provide a method of fabricating a bundle of multiple photonic crystal fibers based on a principle of a conventional total internal reflection mechanism.

In particular, U.S. Pat. No. 6,260,388 discloses a fabricating and drawing method of a photonic crystal fiber preform using a modified extrusion die so as to fabricate a honeycomb-shaped structure consisting of inorganic materials useful to fabricate a catalytic converter used in a release region of an automobile, but the modified extrusion die is different from an extrusion die of the present invention in its structure. In addition, this patent is different from the present invention in that a raw material used in the method is, for example, a mixture of glass powder and a binder, which requires a high temperature sintering process.

An extrusion die of the present invention is advantageous in that the die is useful to extrude a molten polymer, and an optical material different from the optical material used as a continuous phase can constitute the dispersed phase, instead of air.

DISCLOSURE OF THE INVENTION

Accordingly, the present invention has been made keeping in mind the above problems occurring in the prior art, and an object of the present invention is to provide a method of fabricating a plastic optical crystal fiber with a photonic crystal, in which a fine-structured optical fiber is simply and inexpensively fabricated by using a die useful in extruding a molten polymer, and additional factors can be added for more diverse and correct application.

In accordance with the object of the present invention, there is provided a method of fabricating an photonic crystal fiber preform, comprising the step of extruding a first optical material into a continuous phase, and a second optical material into a plurality of dispersed phases to axially orient the dispersed phases.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1A:
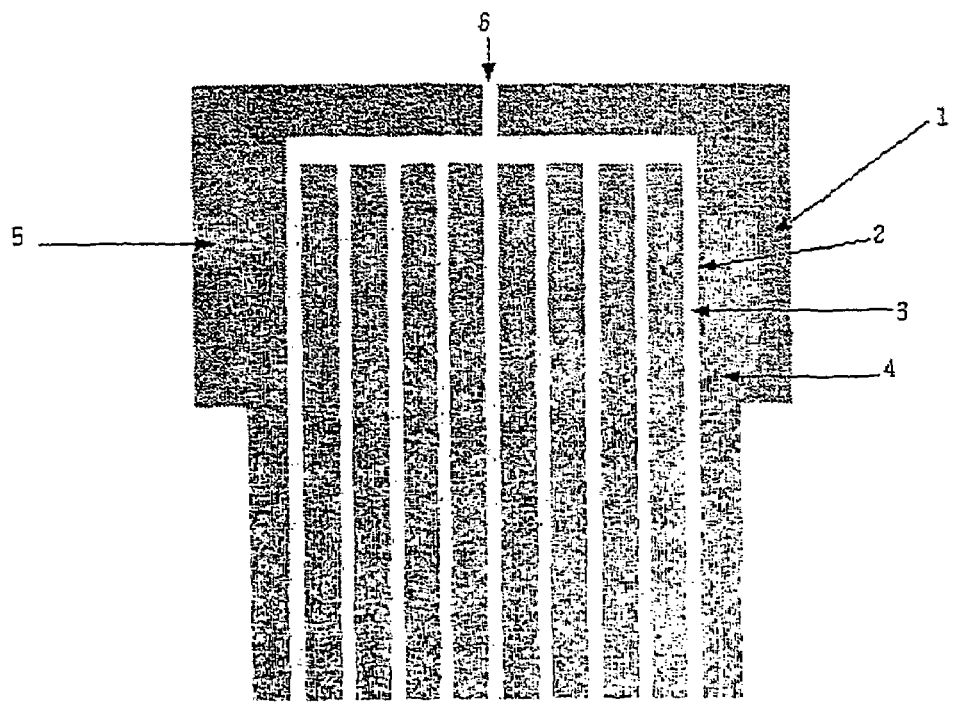
FIG. 1A is a longitudinal sectional view of an extrusion die useful to fabricate a plastic photonic crystal fiber preform according to the present invention.

Reference should now be made to the drawings, in which the same reference numerals are used throughout the different drawings to designate the same or similar components.

According to the present invention, provided is a photonic crystal fiber preform in which dispersed phases are axially oriented in a continuous phase by use of an extrusion die.

The dispersed phase has a predetermined size and shape, and is arranged in the shape of a regular or an irregular lattice. An effective refractive index of a clad layer is varied due to a volume fraction of the dispersed phase, and so peculiar properties not shown in a conventional optical fiber using a step-index difference, are shown in an optical fiber according to the present invention.

Figure 1B:
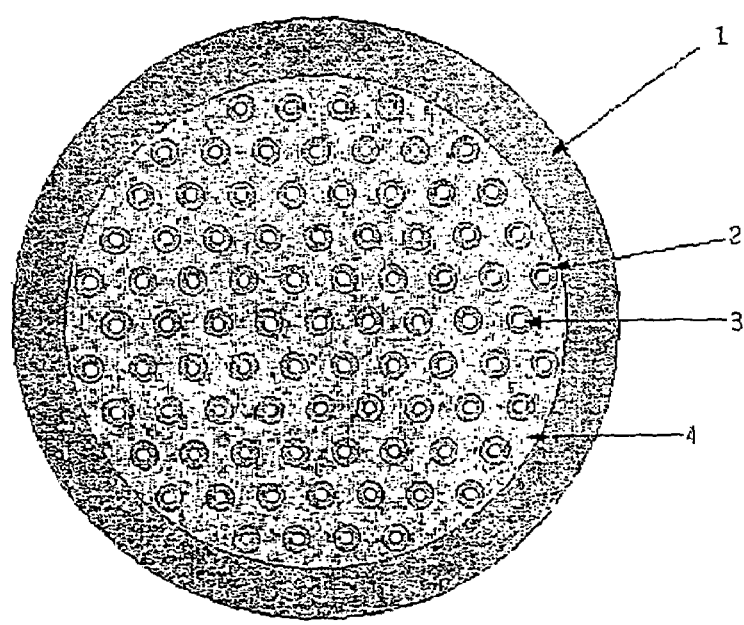
FIG. 1B is a transverse sectional view of FIG. 1A.

With reference to FIGS. 1A and 1B, illustrated are sectional views of an extrusion die useful to fabricate a plastic photonic crystal fiber preform according to the present invention. A molten resin 5 carried from an inlet of a die 1 passes through the die and the extruded resin has the dispersed phases 3 formed by structures 2 arranged at a predetermined interval in the die. A dispersed phase material such as air is injected through an inlet 6 of the die, and distributed in the continuous phase 4.

Figure 2A:
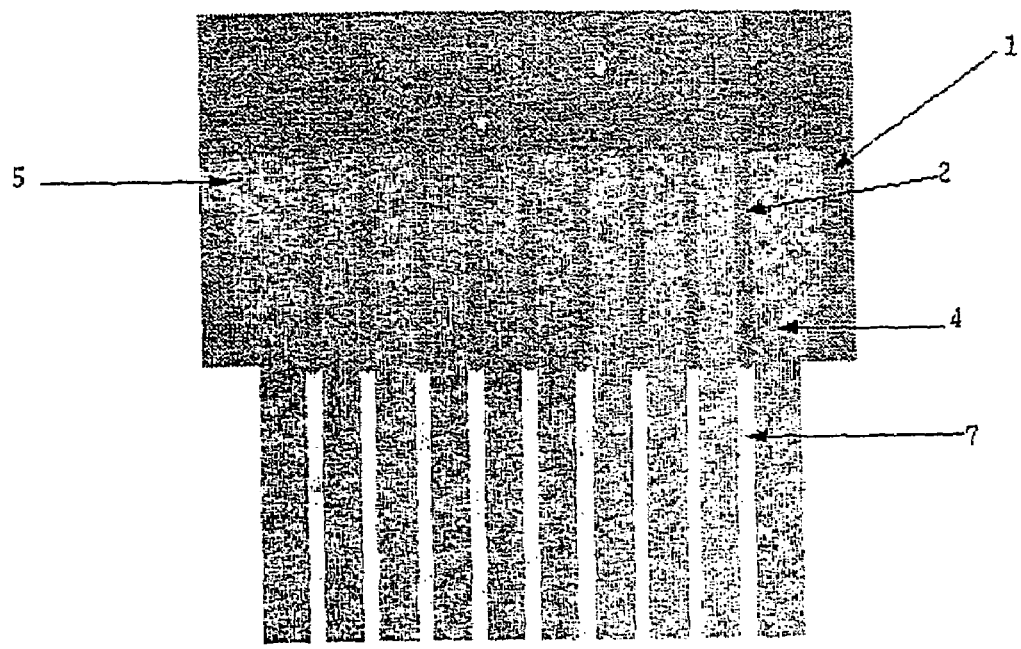
FIG. 2A is a longitudinal sectional view of an extrusion die useful to fabricate a plastic photonic crystal fiber preform according to the present invention, in which air instead of a separate dispersed phase material forms dispersed phases.
Figure 2B:
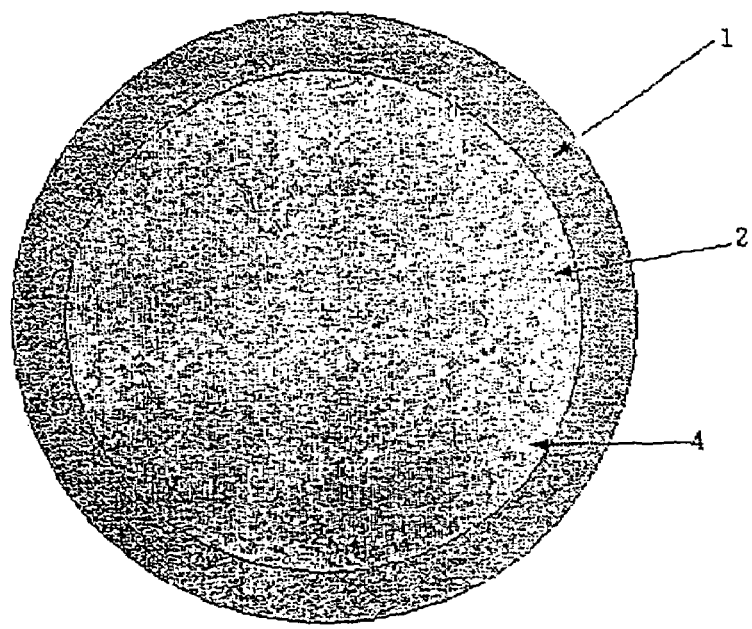
FIG. 2B is a transverse sectional view of FIG. 2A.

Referring to FIGS. 2A and 2B, shown are sectional views of an extrusion die useful to fabricate a plastic photonic crystal fiber preform according to the present invention, in which air instead of a separate dispersed phase material is used as a dispersed phase. If the dispersed phase consists of air, the preform with the continuous phase 4 in which air 7 is dispersed by structures 2 arranged in a, predetermined shape can be fabricated without a separate device for injecting a dispersed phase material into the die.

In the case of fabricating the photonic crystal fiber preform using the extrusion die of the present invention, a shape, a size, and an arrangement, of the dispersed phase, and a distance between dispersed phases are readily modified by changing the structure of the extrusion die.

Figure 3:
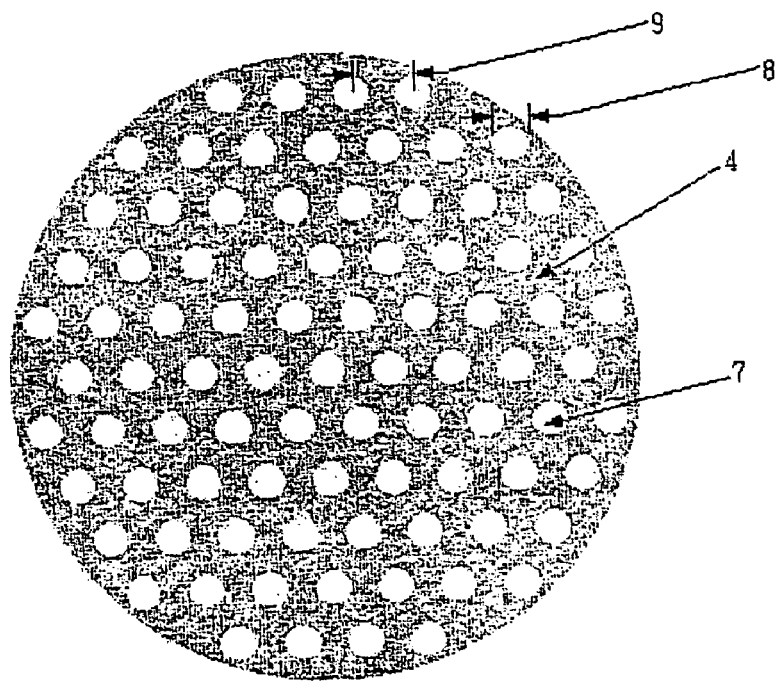
FIG. 3 is a transverse sectional view of the plastic photonic crystal fiber preform according to the present invention.

Turning now to FIG. 3, provided is a transverse sectional view of a plastic photonic crystal fiber preform according to the present invention, wherein reference numerals 8 and 9 denote a diameter d' of the dispersed phase in the preform and a distance $\Delta'$ between centers of dispersed phases, respectively. d' and $\Delta'$ are variable factors useful to change the structure of the extrusion die.

When the photonic crystal fiber preform is fabricated, an optically transparent material is used as a raw material so as to minimize an absorption loss of light with a desired wavelength, and various optical plastic materials having a similar refractive index as silica are used as the raw material, in addition to a conventional silica.

Examples of the optical material useful in the present invention include polymethyl methacrylate, a copolymer mostly consisting of methyl methacrylate, polystyrene, a copolymer mostly consisting of styrene, a copolymer of styrene with acrylonitrile, poly-4-methylpentene-1, a copolymer of ethylene with vinyl acetate, polycarbonate, polychlorostyrene, polyvinylidene chloride, polyvinyl acetate, a tertiary or quaternary copolymer consisting of methyl methacrylate and styrene, vinyltoluene or α-methylstyrene, and maleic anhydride, polydimethylsiloxane, polyacetal, polytetrafluoroethylene, polyvinylidene fluoride, polytrifluoroethylene, polyperfluoropropylene, a copolymer or a tertiary copolymer mostly consisting of fluorene, a blend of polyvinylidene fluoride with polymethyl methacrylate, a polymer mostly consisting of fluoromethacrylate defined as $CH_2=C(CH_3)COORf$ (wherein, Rf is $(CH_2)_m(CF_2)_nH$, $(CH_2)_m(CF_2)_nF$, $CH-(CF_3)_2$, $C(CF_3)_3$, $CH_2CF_2CHFCF_3$, or $CH_2CF_2(CF_3)_2$, and m and n are integers ranging from 1 to 20, respectively), a copolymer partially consisting of fluoromethacrylate, a copolymer of fluoromethacrylate with methylmethacrylate, a polymer mostly consisting of fluoroacrylate defined as $CH_2CHCOOR'f$ (wherein, R'f is $(CH_2)_m(CF_2)_nF$, $(CH_2)_m(CF_2)_nH$, $CH_2CF_2CHFCF_3$, or $CH(CH_3)_2$, and m and n are integers ranging from 1 to 20, respectively), a copolymer partially consisting of fluoroacrylate, a copolymer of fluoroacrylate with fluoromethacrylate, a copolymer of fluoroacrylate, fluoromethacrylate, and methylmethacrylate, a polymer of 2-fluoroacrylate defined by $CH_2=CFCOOR''f$ (wherein, $R''f$ is $CH_3$, $(CH_2)_m(CF_2)_nH$, $(CH_2)_m(CF_2)_nF$, $C(CF_3)_3$, or $CH_2CF_2CHFCF_3$, and m and n are integers ranging from 1 to 20, respectively), and a copolymer partially consisting of 2-fluoroacrylate. To minimize the absorption loss of light with a desired wavelength, an optical material comprising fluoro-substituted plastics or heavy hydrogen substituted plastics may be used.

An optical polymer having a lower refractive index than a first optical material may be used as a second optical material for forming the dispersed phase, and preferably the dispersed phase consists of air.

According to the present invention, in the case of a high refractive index core-type photonic crystal fiber, a core is formed as a continuous phase and light guidance is accomplished according to a total internal reflection mechanism. On the other hand, in the case of a low refractive index core-typed photonic crystal fiber, the core is formed as a dispersed phase, and light guidance is accomplished according to a photonic crystal band gap mechanism. Furthermore, the photonic crystal fiber preform can be fabricated by forming the core with the use of a third optical material having a higher or lower refractive index than the continuous phase.

A better understanding of the present invention may be obtained through the following examples which are set forth to illustrate, but are not to be construed as the limit of the present invention.

EXAMPLE 1

Figure 4:
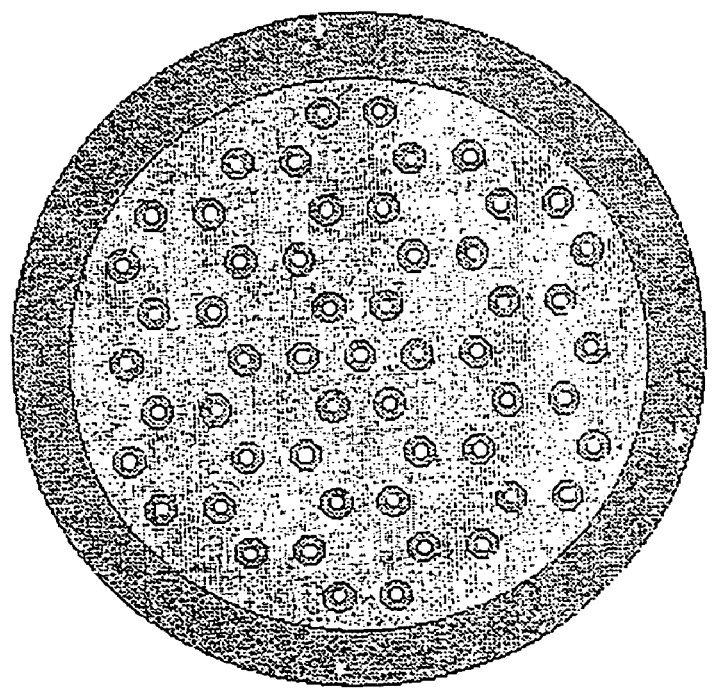
FIG. 4 is a transverse sectional view of the extrusion die used in example 1 of the present invention.

Having a refractive index of 1.49 and a melt flow index of 1.5 g/10 min at 230° C., molten polymethyl methacrylate was extruded through an extrusion die as shown in FIG. 4. Structures for extruding a dispersed phase material were arranged in the shape of a honeycomb and a structure for extruding a core material was positioned at a center of the extrusion die. An extruded preform was composed of a clad region in which hollows with d' of 1 mm and Δ' of 2 mm were arranged in the shape of a honeycomb, and a core hollow with a diameter of 1 mm, positioned at a center of the preform. A diameter of the preform was 50 cm. Nitrogen flowed into the dispersed phase during an extrusion process of the dispersed phase material so as to maintain the shape of the hollow.

EXAMPLE 2

Figure 5:
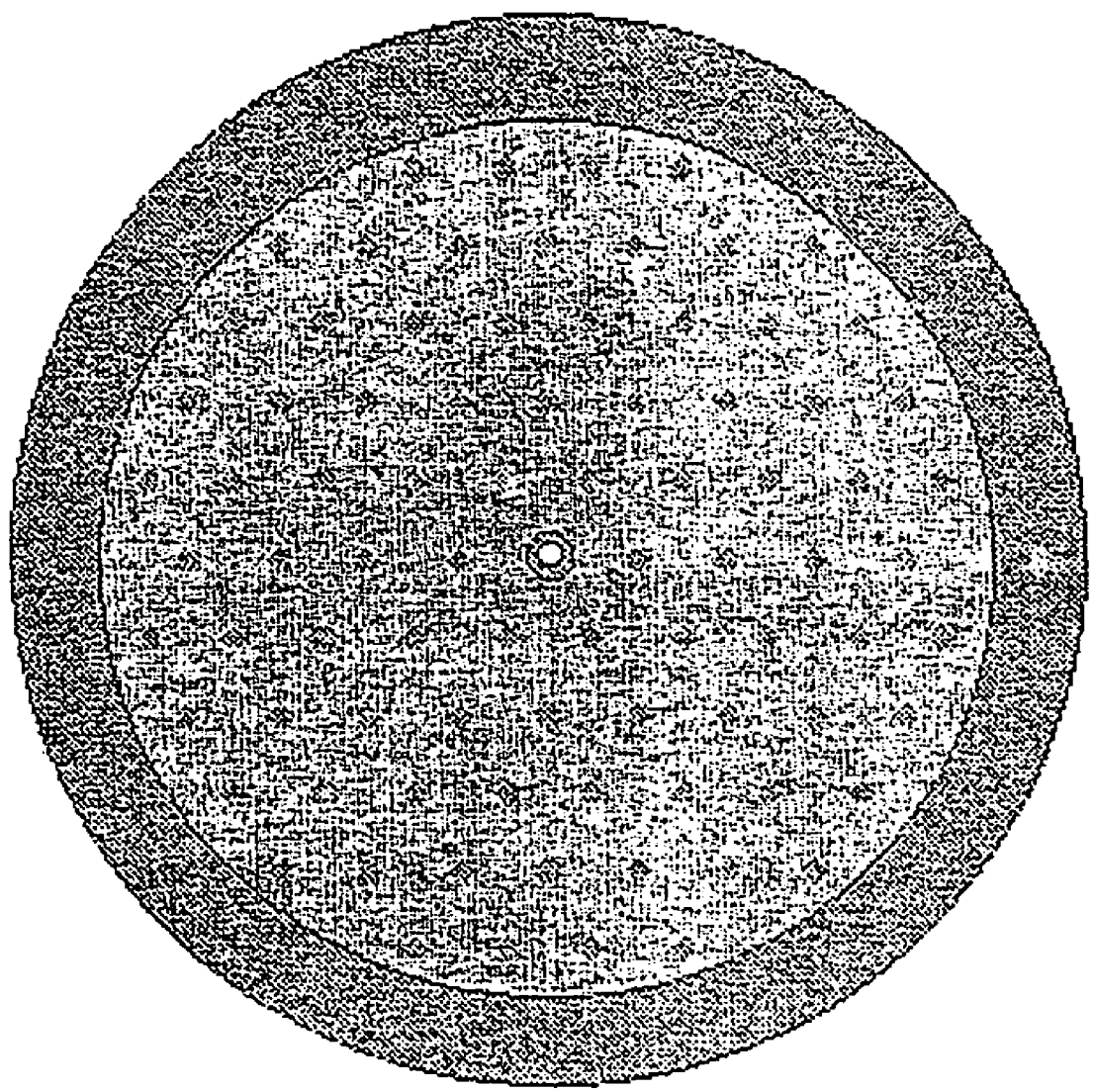
FIG. 5 is a transverse sectional view of the extrusion die used in example 2 of the present invention.

Having a refractive index of 1.49 and a melt flow index of 1.5 g/10 min at 230° C., molten polymethyl methacrylate was extruded through an extrusion die as shown in FIG. 5. Structures for forming a dispersed phase were arranged in the shape of a triangle and a structure for extruding a core material was positioned at a center of the extrusion die. An extruded preform was composed of a clad region in which hollows with d' of 1 mm and Δ' of 2 mm were arranged in the shape of a triangle, and a core, consisting of polymethyl methacrylate with a diameter of 1 mm, positioned at a center of the preform. A diameter of the preform was 50 cm.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of fabricating a photonic crystal fiber preform, comprising the step of:
   extruding a first optical material into a continuous phase, and a second optical material into a plurality of dispersed phases to axially orient the dispersed phases;
   wherein said first optical material and said second optical material are extruded concurrently using one extrusion die; and
   wherein the first optical material is selected from the group consisting of polymethyl methacrylate, a copolymer mostly consisting of methyl methacrylate, polystyrene, a copolymer mostly consisting of styrene, a copolymer of styrene with acrylonitrile, poly-4-methylpentene-1, a copolymer of ethylene with vinyl acetate, polycarbonate, polychlorostyrene, polyvinylidene chloride, polyvinyl acetate, a tertiary or quaternary copolymer consisting of methyl methacrylate and styrene, vinyltoluene or α-methylstyrene, and maleic anhydride, polydimethylsiloxane, polyacetal, polytetrafluoroethylene, polyvinylidene fluoride, polytrifluoroethylene, polyperfluoropropylene, a copolymer or a tertiary copolymer mostly consisting of fluorine, a blend of polyvinylidene fluoride with polymethyl methacrylate, a polymer mostly consisting of fluoromethacrylate defined as $CH_2=C(CH_3)COORf$ (wherein, Rf is $(CH_2)_m(CF_2)_nH$, $(CH_2)_m(CF_2)_nF$, $CH-(CF_3)_2$, $C(CF_3)_3$, $CH_2CF_2CHFCF_3$, or $CH_2CF_2(CF_3)_2$, and m and n are integers ranging from 1 to 20, respectively), a copolymer partially consisting of fluoromethacrylate, a copolymer of fluoromethacrylate with methylmethacrylate, a polymer mostly consisting of fluoroacrylate defined as $CH_2CHCOOR'f$ (wherein R'f is $(CH_2)_m(CF_2)_nF$, $(CH_2)_m(CF_2)_nH$, $CH_2CF_2CHFCF_3$, or $CH(CH_3)_2$, and m and n are integers ranging from 1 to 20, respectively), a copolymer partially consisting of fluoroacrylate, a copolymer of fluoroacrylate with fluoromethacrylate, a copolymer of fluoroacrylate, fluoromethacrylate, and methylmethacrylate, a polymer of 2-fluoroacrylate defined by $CH_2=CFCOOR''f$ (wherein, R''f is $CH_3$, $(CH_2)_m(CF_2)_nH$, $(CH_2)_m(CF2)_nF$, $C(CF_3)_3$, or $CH_2CF_2CHFCF_3$, and m and n are integers ranging from 1 to 20, respectively), and a copolymer partially consisting of 2-fluoroacrylate.

2. A method of fabricating a photonic crystal fiber preform, comprising the step of:
   extruding a first optical material into a continuous phase, and a second optical material into a plurality of dispersed phases to axially orient the dispersed phases;
   wherein said first optical material and said second optical material are extruded concurrently using one extrusion die; and
   wherein the second optical material is selected from the group consisting of polymethyl methacrylate, a copolymer mostly consisting of methyl methacrylate, polystyrene, a copolymer mostly consisting of styrene, a copolymer of styrene with acrylonitrile, poly-4-methylpentene-1, a copolymer of ethylene with vinyl acetate, polycarbonate, polychlorostyrene, polyvinylidene chloride, polyvinyl acetate, a tertiary or quaternary copolymer consisting of methyl methacrylate and styrene, vinyltoluene or α-methylstyrene, and malefic anhydride, polydimethylsiloxane, polyacetal, polytetrafluoroethylene, polyvinylidene fluoride, polytrifluoroethylene, polyperfluoropropylene, a copolymer or a tertiary copolymer mostly consisting of fluorine, a blend of polyvinylidene fluoride with polymethyl methacrylate, a polymer mostly consisting of fluoromethacrylate defined as $CH_2=C(CH_3)COORf$ (wherein, Rf is $(CH_2)_m(CF_2)_nH$, $(CH_2)_m(CF_2)_nF$, $CH-(CF_3)_2$, $C(CF_3)_3$, $CH_2CF_2CHFCF_3$, or $CH_2CF_2(CF_3)_2$, and m and n are integers ranging from 1 to 20, respectively), a copolymer partially consisting of fluoromethacrylate, a copolymer of fluoromethacrylate with methylmethacrylate, a polymer mostly consisting of fluoroacrylate defined as $CH_2CHCOOR'f$ (wherein, R'f is $(CH_2)_m(CF_2)_nF$, $(CH_2)_m(CF_2)_nH$, $CH_2CF_2CHFCF_3$, or $CH(CH_3)_2$, and m and n are integers ranging from 1 to 20, respectively) a copolymer partially consisting of fluoroacrylate, a copolymer of fluoroacrylate with fluoromethacrylate, a copolymer of fluoroacrylate, fluoromethacrylate, and methylmethacrylate, a polymer of 2-fluoroacrylate defined by $CH_2=CFCOOR''f$ (wherein, R''f is $CH_3$, $(CH_2)_m(CF_2)_nH$, $(CH_2)_m(CF_2)_nF$, $C(CF_3)_3$, or $CH_2CHFCF_3$, and m and n are integers ranging from 1 to 20, respectively), and a copolymer partially consisting of 2-fluoroacrylate.

3. A method of fabricating a photonic crystal fiber preform, comprising the step of:

extruding a first optical material into a continuous phase, and a second optical material into a plurality of dispersed phases to axially orient the dispersed phases;

wherein said first optical material and said second optical material are extruded concurrently using one extrusion die;

wherein the photonic crystal fiber preform comprises a core containing a third optical material having a higher or lower refractive index than the continuous phase; and wherein the third optical material is selected from the group consisting of polymethyl methacrylate, a copolymer mostly consisting of methyl methacrylate, polystyrene, a copolymer mostly consisting of styrene, a copolymer of styrene with acrylonitrile, poly-4-methylpentene-1, a copolymer of ethylene with vinyl acetate, polycarbonate, polychlorostyrene, polyvinylidene chloride, polyvinyl acetate, a tertiary or quaternary copolymer consisting of methyl methacrylate and styrene, vinyltoluene or α-methylstyrene, and maleic anhydride, polydimethylsiloxane, polyacetal, polytetrafluoroethylene, polyvinylidene fluoride, polytrifluoroethylene, polyperfluoropropylene, a copolymer or a tertiary copolymer mostly consisting of fluorine, a blend of polyvinylidene fluoride with polymethyl methacrylate, a polymer mostly consisting of fluoromethacrylate defined as $CH_2=C(CH_3)COORf$ (wherein, Rf is $(CH_2)_m(CF_2)_nH$, $(CH_2), (CF_2)_nF$, $CH-(CF_3)_2$, $C(CF_3)_3$, $CH_2CF_2CHFCF_3$, or $CH_2CF_2(CF_3)_2$, and m and n are integers ranging from 1 to 20, respectively), a copolymer partially consisting of fluoromethacrylate, a copolymer of fluoromethacrylate with methylmethacrylate, a polymer mostly consisting of fluoroacrylate defined as $CH_2CHOOR'f$ (wherein R'f is $(CH_2)_m(CF_2)_nF$, $(CH_2)_m(CF_2)_nH$, $CH_2CF_2CHFCF_3$, or $CH(CH_3)_2$, and m and n are integers ranging from 1 to 20, respectively), a copolymer partially consisting of fluoroacrylate, a copolymer of fluoroacrylate with fluoromethacrylate, a copolymer of fluoroacrylate, fluoromethacrylate, and methylmethacrylate, a polymer of 2 fluoroacrylate defined by $CH_2=CFOOR''f$ (wherein, R''f is $CH_3$, $(CH_2)_m(CF_2)_nH$, $(CH_2)_m(CF_2)_nF$, $C(CF_3)_3$, or $CH_2CF_2CHFCF_3$, and m and n are integers ranging from 1 to 20, respectively), and a copolymer partially consisting of 2-fluoroacrylate.

* * * * *